United States Patent Office 3,423,371
Patented Jan. 21, 1969

3,423,371
CROSS-LINKED POLYESTERS
Robert M. Lusskin, Neenah, Wis., Frank Backer, Albany, N.Y., and John R. Larson, Upper Saddle River, N.J., assignors to Universal Oil Products Company, Des Plaines, Ill., a corporation of Delaware
No Drawing. Continuation-in-part of application Ser. No. 311,620, Sept. 26, 1963. This application June 7, 1967, Ser. No. 644,111
U.S. Cl. 260—75    10 Claims
Int. Cl. C08g 17/08

ABSTRACT OF THE DISCLOSURE

Polymeric compositions of matter which possess improved physical characteristics such as flame retardancy and color stability are prepared by reacting a compound selected from the group consisting of polyhalopolyhydromethanonaphthalenedicarboxylic acids or anhydrides with a polymer prepared by reacting a polybasic acid with an excess of a polyol, said polymer containing at least one reactive functional group.

This application is a continuation-in-part of our copending application Ser. No. 311,620 filed Sept. 26, 1963, now abandoned.

This invention relates to polymeric compositions of matter and particularly to polymeric compositions of matter containing, as one component thereof, a polyhalopolyhydromethanonaphthalenedicarboxylic acid or anhydride thereof.

It is known in the prior art to prepare certain polymeric compositions of matter which contain, as one component thereof, a polyhalopolyhydromethanonaphthalenedicarboxylic acid or anhydride thereof. One example of these prior art compositions comprises a polymer which is prepared by condensing a polyhalopolyhydromethanonaphthalenedicarboxylic acid or anhydride thereof with a dibasic acid and a compound which contains an ethylenically unsaturated bond, said ethylenic unsaturation remaining after the reaction of the aforementioned components. This results in a polyester which is copolymerizable with an olefinic cross-linking agent. However, the ethylenic unsaturation will enter into the reaction by reaction with the olefinic cross-linking agent. In contradistinction to this, the polymeric compositions of matter which are prepared according to the process herein described will differ from these prior art polymers in that a saturated dibasic acid may be reacted with an excess of a polyol and thereafter treated with a polyhalopolyhydromethanenaphthalenedicarboxylic acid or anhydride thereof which will act as a curing or a cross-linking agent. Likewise, if an unsaturated dibasic acid is used as a component of the polymer which is formed by the reaction of said unsaturated dibasic acid with an excess of a polyol to form a polyester which is thereafter cured or cross-linked with the polyhalopolyhydromethanonaphthalenedicarboxylic acid or anhydride thereof, the unsaturated linkage will not enter into the reaction but will remain in an unsaturated state. Therefore, the polymeric compositions of matter which are formed by the process herein described will result in novel compositions of matter which differ from those prepared according to the prior art.

The polymeric compositions of matter which are prepared according to the process of this invention in a manner hereinafter set forth in greater detail will possess many particular and desirable physical properties which make these particular compounds desirable and commercially attractive. For example, the polymers which may be prepared by treating a prepolymer with a polyhalopolyhydromethanonaphthalenedicarboxylic acid or anhydride thereof will possess fire retardant properties superior, in many instances, to other polymeric compositions of matter now in use. This property will be found to be of special advantage when preparing plastic materials to be utilized in places subject to excessive heat or possible flames, such uses including architectural paneling for construction work, ash trays, wall plugs for electrical connections, etc. In addition, the finished polymeric composition of matter when utilized to prepare polyurethane foams, will possess a high degree of fire resistance and therefore may be used for insulation where the aforementioned fire resistance is of primary concern. Furthermore, by utilizing a polyhalopolyhydromethanonaphthalenedicarboxylic acid or anhydride thereof as a constituent in the finished polymer, said product will be resistant to a large extent, to discoloration as compared with polymeric products which have been prepared utilizing other chlorinated cyclic derivatives. The acid or anhydride, due to its stability, and resistance to deterioration, will thus make it an attractive constituent of plastic materials or polymers which are colorless and should remain so, or which are colored and will not darken, lighten or turn another color.

The color stability of products derived from polyhalopolyhydronaphthalenedicarboxylic acids and anhydrides thereof compared with similar compounds not containing the cyclohexane ring would not be expected based on current theoretical reasoning. Because alkylated cyclohexanes are known to undergo autoxidation readily, it might be predicted that polyhalopolyhydroalkanonaphthalenedicarboxylic acids and anhydrides thereof would be rapidly attacked by atmospheric oxygen and susceptible to free radical reactions catalyzed by light. Such attack should lead initially to hydroperoxide formation at the various ring junctions as well as at the positions alpha to the carboxyl groups. Decomposition of the hydroperoxides would lead to formation of alcohols, ketones, olefins, ring opening and further attack on the susceptible methylene carbon atoms. The products of these reactions which might be aromatic compounds, quinones and condensed materials would liberate hydrogen chloride and form highly colored products. The reason that these processes fail to occur with polyhalopolyhydroalkanonaphthalenedicarboxylic acids and anhydrides thereof has not been proven at this time. The term "prepolymer" as used hereinafter in the present specification and appended claims will refer to compositions of matter, comprising the reaction product of polymerizable monomers, containing reactive functional substituents which will react with the polyhalopolyhydromethanonaphthalenedicarboxylic acid or anhydride thereof in a chemical manner to thus prepare the finished and desired composition of matter.

It is therefore an object of this invention to provide novel compositions of matter which possess desirable properties of flame retardancy and high color stability.

Another object of this invention is to provide novel compositions of matter by reacting certain prepolymeric compounds with a polyhalopolyhydromethanonaphthalenedicarboxylic acid or anhydride thereof to prepare compounds possessing valuable physical properties.

In one aspect, an embodiment of this invention is found in a composition of matter comprising the reaction product formed at a temperature from about 25° C. to about 300° C. of a compound selected from the group consisting of polyhalopolyhydromethanonaphthalenedicarboxylic acids and anhydrides thereof with a polymer containing at least one reactive functional group, said polysecond condensation reaction is also the Diels-Alder type and may be effected at elevated temperature in the range of from about 50° to about 250° C. and at atmospheric or superatmospheric pressures ranging up to about 100 atmospheres or more, the pressure being such as to maintain a major portion of the reactants in the liquid phase at the reaction temperature. If so desired, both Diels-Alder condensation may be effected in the presence of an inert organic solvent, including aromatic solvents such as benzene, toluene, o-xylene, m-xylene, p-xylene, saturated paraffins and cycloparaffins such as pentane, hexane, heptane, cyclopentane, methylcyclopentane, etc.

Examples of polyhalopolyhydromethanonaphthalenedicarboxylic acids or anhydrides thereof which may be prepared include, 5,6,7,8,9,9-hexachloro-2,3-naphthalene-methano-2,3-naphthalenedicarboxylic acid, 5,6,7,8,9,9-hexachloro-1,2,3,4,4a,5,8,8a-octahydro-5,8-methano-2,3-naphthalenedicarboxylic anhydride, 5,6,7,8,9,9-hexabromo-1,2,3,4,4a,5,8,8a-octahydro-5,8-methano-2,3-naphthalenedicarboxylic acid, 5,6,7,8,9,9-hexabromo-1,2,3,4,4a,5,8,8a-octahydro-5,8-methano-2,3-naphthalenedicarboxylic anhydride, 5,6,7,8-tetrachloro-1,2,3,4,4a,5,8,8a-octahydro-5,8-methano-2,3-naphthalenedicarboxylic acid, 5,6,7,8-tetrachloro-1,2,3,4,4a,5,8,8a-octahydro-5,8-methano-2,3-naphthalenedicarboxylic anhydride, 5,6,7,8-tetrabromo-1,2,3,4,4a,5,8,8a-octahydro-5,8-methano-2,3-naphthalenedicarboxylic acid, 5,6,7,8-tetrabromo-1,2,3,4,4a,5,8,8a-octahydro-5,8-methano-2,3-naphthalenedicarboxylic anhydride.

As hereinbefore set forth, the aforementioned polyhalopolyhydromethanonaphthalenedicarboxylic acids or anhydrides thereof are reacted with certain polymeric compositions of matter containing at least one reactive functional group. An example of these polymeric products comprise epoxy resins which may be cured by the polyhalopolyhydromethanonaphthalenedicarboxylic acid or anhydride. The resins in an uncured state may range from low viscosity liquids to relatively brittle solids. Ex-

— temperature of about 25° to about 300° C. of this invention is found in a polybasic acid with the reaction product comprising methano-2,3-naphthalenedicarboxylic anhydride with a polymer containing at least one reactive functional group, said polymer comprising a maleic anhydride-1,2,6-hexanetriol polyester.

Other objects and embodiments will be found in the following further detailed description of this invention.

As hereinbefore set forth, it has now been discovered that polyhalopolyhydromethanonaphthalenedicarboxylic acids or anhydrides thereof of the type hereinafter set forth in greater detail, may be reacted with prepolymeric compositions of matter to form finished polymers which will possess desired physical properties. Examples of prepolymers which will contain at least one reactive functional group, said reactive functional group being capable of reacting with a polyhalopolyhydromethanonaphthalenedicarboxylic acid or anhydride thereof to form the finished product, will include polymers generically referred to as epoxy resins, urethanes, polyamides, polyols and polyesters. The particular polyhalomethanonaphthalenedicarboxylic acid or anhydride thereof will act to a certain extent as a curing agent or crosslinking agent and thus, enable the finished product to possess the desired physical characteristics and a particular example of possible deterioration, a particular example of superior stability against discoloration, a particular products utilizing chlorinated compounds as comprising chlorinated compounds but not utilizing chlorinated products, but not retardance to the finished product, but not carboxylic acid or anhydride thereof of said polyhalopolyhydromethanonaphthalenedicarboxylic acid or anhydride thereof, set forth in greater detail, the finished therefore set forth, will possess a relatively discoloration due to the structural configuration of the polyhalopolyhydromethanonaphthalenedicarboxylic acid anhydride which is used as the crosslinking agent.

ing fast drying, possessing a hard surface, a deep gloss, a high resistance to abrasion and weathering as well as an excellent resistance to fire. When utilizing these urethanes as coatings of this type, it is necessary in many instances that the coating also have a high resistance to changes in color especially when being exposed to climatic conditions of sun, heat, coal, etc. By utilizing a polyhalopolyhydromethanonaphthalenedicarboxylic acid or anhydride of the type set forth in the present invention, the coating will possess fire retardancy as well as the necessary physical characteristics and retain the desired color for a longer period of time than will urethane coatings which do not contain this particular acid or anhydride but contain other chlorinated cyclic derivatives.

Yet another example of prepolymers containing an excess of at least one reactive functional group which may be reacted with the polyhalopolyhydromethanonaphthalenedicarboxylic acid or anhydride comprises polyamides. These polyamides may be prepared by condensing a polyamide with a dibasic acid. Examples of these polyamides would be the condensation of an amine containing more than two functional groups such as diethylenetriamine, dipropylenetriamine, etc., or with a molar excess of a diamine such as ethylenediamine, propylenediamine, etc., with a dibasic acid such as adipic acid, sebacic acid, etc. to form a prepolymer, said prepolymer containing a reactive functional amine group which may then be cross-linked with a polyhalopolyhydromethanonaphthalenedicarboxylic acid or anhydride thereof. This cross-linking may be done at temperatures ranging from about 200° up to about 300° C. or more. The resulting cured or cross-linked polyamide may then be used for molding resins, films, coatings, insulation, etc., the finished product again exhibiting the desired physical properties of being flame resistant and also being resistant to color changes due to the stability of the polyhalopolyhydromethanonaphthalenedicarboxylic acid or anhydride thereof which is utilized in the preparation as contrasted to other polyamine compounds which contain chlorinated cyclic derivatives.

Another example of a polymer or prepolymer which may be cured or cross-linked by use of the aforementioned acid or anhydride thereof are polyesters. These polyesters are prepared by reacting a polybasic acid with an excess of a polyol at condensation conditions. The resulting ester may then be cured or cross-linked with a polyhalopolyhydromethanonaphthalenedicarboxylic acid or anhydride thereof to form the desired products. The overall reaction will comprise reacting one equivalent of polyol with less than one equivalent of the polybasic acid and thereafter cross-linking or curing with an amount of the polyhalo substituted acid or anhydride equal to 1 minus the equivalent of the polybasic acid which was used. The polybasic acids, and preferably dibasic acids which are used will be either saturated or unsaturated in nature. Examples of saturated dibasic acids which may be used include oxalic acid, malonic acid, succinic acid, glutaric acid, adipic acid, pimelic acid, suberic acid, azelaic aid, sebacic acid, brassic acid, brassylic acid, roccelic acid, etc.; unsaturated dibasic acids which may be used include fumaric acid, maleic acid, the isometric $C_5$ acids such as glutaconic, citraconic, itaconic acid, ethidenemalonic acid, mesaconic acid; the isomeric $C_6$ acids including allylmalonic acid, propylidenemalonic acid, hydromuconic acid, pyrocinchonic acid; the isomeric $C_7$ acids such as allylsuccinic acid, carbocaprolactonic acid, teraconic acid; the $C_8$ acids such as xeronic acid; the $C_{19}$ acids such as cetylmalonic acid, etc. In addition, it is also contemplated that dibasic aromatic acids such as terphthalic and isophthalic acids may also be used. Examples of polyols which may be used include ethylene glycol, diethylene glycol, propylene glycol, butylene glycols, tetramethylethylene glycol, 1,2,6-hexanetriol, 1,3,6-hexanetriol, phenylglycol, 1,4-cyclohexanediol, 1,4-di(hydroxymethyl)cyclohexane, etc.

It is to be understood that the aforementioned dibasic acids and polyols are only representatives of the class of compounds which may be used to form polyesters which are thereafter cured or cross-linked with the acid or anhydride of the type hereinbefore set forth, and that the present invention is not necessarily limited thereto. The resins which result from the curing or cross-linking will possess both flame-retardant and color-stable properties. The resins may be in the form of alkyds and may be used as coatings or the cross-linked polyesters may be used for molding and casting polymers which also possess the aforementioned desired physical characteristics.

The prepolymers of the type hereinbefore set forth which contain an excess of at least one reactive functional group, and the polyhalopolyhydromethanonaphthalenedicarboxylic acid or anhydride thereof may be reacted in any manner known in the art, the reaction conditions such as temperature and pressure being dependent upon the particular compounds undergoing curing or cross-linking. Usually the curing or cross-linking of the prepolymer with the particular acid or anhydride thereof will be effected at temperatures ranging from room temperature (about 25° C.) up to about 300° C. or more. In addition, the acid or anhydride thereof will be present in the finished reaction product in various concentrations, ranging from about 5% to about 50% or more of the finished product, the particular concentration again being dependent upon the particular use to which the finished polymeric product will be put.

The following examples are given to illustrate the process of the present invention which, however, are not intended to limit the generally broad scope of the present invention in strict accordance therewith.

Example I

An epoxy resin is prepared by condensing epichlorohydrin and bis phenol. The resin is liquid at room temperature and is cured by placing the resin and an equimolecular amount of 5,6,7,8,9,9-hexachloro-1,2,3,4,4a,5,8,8a-octahydro-5,8-methano-2,3 - naphthalenedicarboxylic anhydride in an apparatus provided with heating means The mixture is slowly heated and poured into a glass mold where it is cured at a temptrature of about 150° C. for approximately 6 hours.

The cured epoxy resin has a hardness as measured by a Shore Durometer of about 82. The resin is subjected to the direct action of a flame and shows an excellent flame retardancy by not burning when removed from the direct action of the flame, said cured resin being self-extinguishing. In addition the cured resin possesses excellent color stability when it is compared to another epoxy resin which is cured by treatment with a curing agent comprising a chlorinated cyclic compound which does not contain the specific structure of the compounds of the present invention, particularly the absence of a cyclohexane ring.

Example II

In this example of polyester is prepared by reacting 146 g. (1.0 mole) of adipic acid, and 106 g. (1.0 mole) of diethylene glycol with heating for a predetermined period of time at a temperature of about 150° C. The mixture is then cured by reaction with 443 g. (1.0 mole) of 5,6,7,8,9,9 - hexachloro - 1,2,3,4,4a,5,8,8a - octahydro-5,8-methano-2,3-naphthalenedicarboxylic acid to form the desired product. This product possesses excellent color stability said product retaining the original color for a relatively long period of time as compared to other polyesters which are prepared utilizing other chlorinated cyclic compounds, as well as exhibiting excellent fire retardant properties.

Example III

In this example a prepolymer is prepared by condensing 103 g. (1.0 mole) of diethylenetriamine with 146 g. (1.0 mole) of adipic acid. The prepolymer is then cured by reacting said prepolymer with 425 g. (1.0 mole) of 5,6,7,8,9,9 - hexachloro - 1,2,3,4,4a,5,8,8a - octahydro- 5,8-methano-2,3-naphthalenedicarboxylic anhydride to form a polymer which, as in the case in the polymers formed in the above examples, possesses an excellent color stability and flame retardancy as contrasted to other polymers of similar type which are prepared by using other chlorinated cyclic compounds which possess fire retardant, but not color stability, properties.

Example IV

A prepolymer is formed by condensing 98 g. (1.0 mole) of maleic anhydride with 134 g. (1.0 mole) of 1,2,6-hexanetriol at an elevated temperature at about 150° C. to form a polyester. This polyester which comprises the prepolymer is cured or cross-linked by reacting said polyester with 425 g. (1.0 mole) of 5,6,7,8,9,9-hexachloro-1,2,3,4,4a,5,8,8a - octahydro - 5,8 - methano - 2,3 - naphthalenedicarboxylic anhydride also at an elevated temperature to prepare a cured polyester resin which possesses excellent color stability and flame retardant properties.

Example V

A polyester is prepared by condensing and reacting 142 g. (1.0 mole) of 1,4-di(hydroxymethyl)cyclohexane with 101 g. (0.5 mole) of sebacic acid, said reaction being effected by heating the aforementioned compounds for a predetermined period of time at a temperature of about 150° C. The mixture is then cured by treating the polymer with 221 g. (0.5 mole) of 5,6,7,8,9,9-hexachloro-1,2,3, 4,4a,5,8,8a - octahydro - 5,8 - methano - 2,3 - naphthalenedicarboxylic acid to form the desired product. This product will possess excellent color stability by retaining the original color for a relatively long period of time, and in addition will exhibit excellent fire retardant properties.

Example VI

In this example, a prepolymer is prepared by heating 90 g. (1.0 mole) of 1,4-butylenediol with 41.5 g. (0.25 mole) of terphthalic acid at a temperature of about 150° C. for a predetermined period of time. The resulting polyester which comprises the prepolymer containing a reactive functional group is then cured or cross-linked by reacting said polyester with 318 g. (0.75 mole) of 5,6,7,8-tetrachloro - 1,2,3,4,4a,5,8,8a - octahydro - 5,8 - methano-2,3-naphthalenedicarboxylic anhydride also at an elevated temperature, the resultant cured polyester resin possessing the desirable physical characteristics of color stability and fire retardancy.

Example VII

A polyester is prepared by condensing 134 g. (1.0 mole) of 1,4-cyclohexanediol with 130.5 g. (0.75 mole) of suberic acid, said condensation being effected at an elevated temperature of about 150° C. for a predetermined period of time. The resultant polyester is then cured by treating said polyester with 106 g. (0.25 mole) of 5,6,7, 8,9,9 - hexachloro - 1,2,3,4,4a,5,8,8a - octahydro - 5,8-methano-2,3-naphthalenedicarboxylic anhydride for a predetermined curing time. The resultant cured polyester resin will possess excellent color stability and flame retardant properties when contrasted to other polymers of a similar type which have been treated by using other curing agents.

We claim as our invention:

1. A cross-linked polyester formed by reacting, at a temperature of from about 25° C. to about 300° C., a mixture consisting essentially of (1) a compound selected from the group consisting of polyhalopolyhydromethanonaphthalenedicarboxylic acids and anhydrides thereof and (2) a hydroxyl-containing polymer, said polymer having been formed by the polymerization reaction of (A) a dibasic acid selected from the group consisting of aliphatic dicarboxylic acids and benzene dicarboxylic acids with (B) an excess of a polyol selected from the group consisting of alkanediols, alkanetriols, diethylene glycol, cyclohexanediol, di(hydroxy-lower alkyl) cyclohexanes and phenyl glycol, there being from 1.3 to 4 equivalents of polyol per equivalent of dicarboxylic acid.

2. The cross-linked polyester of claim 1, further characterized in that said acid or anhydride thereof is present in an amount of from about 5% to about 50% by weight of the finished product.

3. The cross-linked polyester of claim 1, further characterized in that said polyhalopolyhydromethanonaphthalenedicarboxylic anhydride comprises 5,6,7,8,9,9-hexachloro - 1,2,3,4,4a,5,8,8a - octahydro - 5,8- methano - 2,3-naphthalenedicarboxylic anhydride.

4. The cross-linked polyester of claim 1, further characterized in that said polyhalopolyhydromethanonaphthalenedicarboxylic anhydride comprises 5,6,7,8-tetrachloro-1,2,3,4,4a,5,8,8a - octahydro - 5,8 - methano - 2,3 - naphthalenedicarboxylic anhydride.

5. The cross-linked polyester of claim 1, further characterized in that said polyhalopolyhydromethanonaphthalenedicarboxylic acid comprises 5,6,7,8,9,9-hexabromo-1,2,3,4,4a,5,8,8a - octahydro - 5,8 - methano - 2,3 - naphthalenedicarboxylic acid.

6. The cross-linked polyester of claim 1, further characterized in that said polymer comprises an adipic acid-diethylene glycol polyester.

7. The cross-linked polyester of claim 1, further characterized in that said polymer comprises a maleic acid-1,2,6-hexanetriol polyester.

8. The cross-linked polyester of claim 1, further characterized in that said polymer comprises a sebacic acid-1,4-dihydroxymethylcyclohexane polyester.

9. The cross-linked polyester of claim 1, further characterized in that said polymer comprises a terphthalic acid-1,4-butylenediol polyester.

10. The cross-linked polyester of claim 1, further characterized in that said polymer comprises a suberic acid-1,4-cyclohexanediol polyester.

References Cited

UNITED STATES PATENTS

| 3,297,606 | 1/1967 | Dunkel | 260—75 |
| 3,196,191 | 7/1965 | Haigh | 260—75 |
| 3,105,087 | 9/1963 | Roberts et al. | 260—75 |
| 3,268,477 | 8/1966 | Mueller | 260—75 |

WILLIAM H. SHORT, *Primary Examiner.*

R. LYON, *Assistant Examiner.*

U.S. Cl. X.R.

260—78, 47